United States Patent
Wu

(10) Patent No.: US 12,301,083 B2
(45) Date of Patent: May 13, 2025

(54) MOTOR, AND STATOR AND ELECTRIC DEVICE THEREOF

(71) Applicant: CONTEMPORARY AMPEREX INTELLIGENCE TECHNOLOGY (SHANGHAI) LIMITED, Shanghai (CN)

(72) Inventor: Kai Wu, Shanghai (CN)

(73) Assignee: CONTEMPORARY AMPEREX INTELLIGENCE TECHNOLOGY (SHANGHAI) LIMITED, Shanghai (CN)

(*) Notice: Subject to any disclaimer, the term of this patent is extended or adjusted under 35 U.S.C. 154(b) by 0 days.

(21) Appl. No.: 18/680,160

(22) Filed: May 31, 2024

(65) Prior Publication Data

US 2024/0322629 A1 Sep. 26, 2024

Related U.S. Application Data

(63) Continuation of application No. PCT/CN2022/120031, filed on Sep. 20, 2022.

(51) Int. Cl.
*H02K 3/28* (2006.01)
*H02K 3/12* (2006.01)
*H02K 3/14* (2006.01)

(52) U.S. Cl.
CPC ............. *H02K 3/28* (2013.01); *H02K 3/12* (2013.01); *H02K 3/14* (2013.01)

(58) Field of Classification Search
CPC ......... H02K 3/12–14; H02K 3/28; H02K 3/48
USPC ................................................. 310/202–208
See application file for complete search history.

(56) References Cited

U.S. PATENT DOCUMENTS

| | | | |
|---|---|---|---|
| 11,824,413 B2* | 11/2023 | Rahman | H02K 3/28 |
| 2003/0001450 A1 | 1/2003 | Kazmierczak | |
| 2015/0022046 A1* | 1/2015 | Shibata | H02K 3/28 |
| | | | 310/208 |
| 2015/0028714 A1* | 1/2015 | Matsuoka | H02K 3/12 |
| | | | 310/198 |

FOREIGN PATENT DOCUMENTS

| | | |
|---|---|---|
| CN | 207766053 U | 8/2018 |
| CN | 207766054 U | 8/2018 |
| CN | 110912310 A | 3/2020 |
| CN | 217334332 U | 8/2022 |
| CN | 117916980 A | 4/2024 |
| JP | 2015223076 A | 12/2015 |

(Continued)

OTHER PUBLICATIONS

Machine translation of WO 2024060038 A1 (Year: 2024).*

(Continued)

*Primary Examiner* — Quyen P Leung
*Assistant Examiner* — Minki Chang
(74) *Attorney, Agent, or Firm* — ANOVA LAW GROUP, PLLC

(57) ABSTRACT

A stator includes a stator iron core and a stator winding provided at the stator iron core. The stator iron core has a plurality of winding slots formed in an inner wall thereof. The stator winding includes a conductor inserted in the plurality of winding slots. The stator winding includes a plurality of phase windings, and each of the plurality of phase windings includes a first branch and a second branch.

16 Claims, 14 Drawing Sheets

(56) References Cited

FOREIGN PATENT DOCUMENTS

| | | |
|---|---|---|
| JP | 2019205244 A | 11/2019 |
| JP | 2022067638 A | 5/2022 |
| WO | WO-2024060038 A1 * | 3/2024 |

OTHER PUBLICATIONS

The World Intellectual Property Organization (WIPO) International Search Report and Written Opinion for PCT/CN2022/120031 May 18, 2023 13 Pages (including translation).
China National Intellectual Property Administration (CNIPA) Office Action 1 for Application No. 202280005833.X Oct. 19, 2024 11 Pages (including translation).
The European Patent Office (EPO) The Extended European Search Report for Application No. 22959050.0 Nov. 22, 2024 12 Pages.
State Intellectual Property Office of China Notice of Grant of Invention Patent Right for Application No. 202280005833.X Jan. 3, 2025 9 pages (including translation).

* cited by examiner

MOTOR, AND STATOR AND ELECTRIC DEVICE THEREOF

CROSS-REFERENCE TO RELATED APPLICATION

This application is a continuation of International Application No. PCT/CN2022/120031, filed on Sep. 20, 2022, the entire content of which is incorporated herein by reference.

FIELD

The present disclosure relates to the technical field of power equipment, and more particularly, to a motor, and a stator and an electric device thereof.

BACKGROUND

With the development of the new energy automobile industry, the development of its driving motor also tends to high-voltage, high-speed, integrated, platformed, and miniaturized directions.

At present, how to reduce the internal voltage drop of a motor and reduce the internal energy loss is one of the research objectives in the art.

SUMMARY

The present disclosure provides a motor and a stator thereof, which can reduce the voltage drop of an internal winding of the motor and reduce the internal energy loss of the motor.

In a first aspect, embodiments of the present disclosure provide a stator of a motor. The stator includes a stator iron core and a stator winding provided at the stator iron core. The stator iron core has a plurality of winding slots formed in an inner wall of the stator iron core, and the stator winding includes a plurality of conductors inserted in the plurality of winding slots and a plurality of phase windings.

The n conductor layers are arranged in each of the plurality of winding slots, and n is a positive even number. The n conductor layers are denoted as an $L_1$ conductor layer, an $L_2$ conductor layer, ... and an $L_n$ conductor layer in a direction in which a bottom of the winding slot is directed towards an opening of the winding slot.

Each of the plurality of phase windings includes a plurality of pole phase groups, and each of the plurality of pole phase groups of the phase winding includes a first region, a second region, and a third region. The second region and the third region are located at two sides of the first region, respectively. The $L_1$ conductor layer to the $L_n$ conductor layer are located in the first region. An $L_{n/2+1}$ conductor layer to the $L_n$ conductor layer are located in the second region, and the $L_1$ conductor layer to an $L_{n/2}$ conductor layer are located in the third region.

Each of the plurality of phase windings includes a first branch and a second branch, and the first branch includes 4k conductors sequentially connected in series, where k is a positive integer. The 4k conductors of the first branch are denoted as an $A_1$ conductor, ... an $A_{2k}$ conductor, ... and an $A_{4k}$ conductor. The second branch includes 4k conductors sequentially connected in series, and the 4k conductors of the second branch are denoted as a $B_1$ conductor, ... a $B_{2k}$ conductor, ... and a $B_{4k}$ conductor.

The $A_1$ conductor to the $A_{2k}$ conductor and the $B_1$ conductor to the $B_{2k}$ conductor are arranged in the first region. Some of an $A_{2k+1}$ conductor to the $A_{4k}$ conductor are arranged in the second region, and the remaining of the $A_{2k+1}$ conductor to the $A_{4k}$ conductor are arranged in the third region. Some of a $B_{2k+1}$ conductor to the $B_{4k}$ conductor are arranged in the second region, and the remaining of the $B_{2k+1}$ conductor to the $B_{4k}$ conductor are arranged in the third region.

In the technical solutions of the embodiments of the present disclosure, the front half conductors of the first branch and the front half conductors of the second branch are arranged in the first region, and the rear half conductors of the first and second branches are arranged in the second region and the third region. In this way, the maximum voltage drop between adjacent out-of-phase conductors and the maximum voltage drop between adjacent in-phase conductors can be reduced, improving insulation reliability of the stator winding, reducing internal loss of the motor, and improving energy conversion efficiency of the motor. Further, the above structure constitutes a short-pitch winding, which can reduce winding harmonics, suppress torque ripple, improve noise vibration, and improve efficiency.

In some embodiments, the $A_{2k+1}$ conductor to an $A_{3k}$ conductor are arranged in the second region, an $A_{3k+1}$ conductor to the $A_{4k}$ conductor are arranged in the third region, the $B_{2k+1}$ conductor to a $B_{3k}$ conductor are arranged in the third region, a $B_{3k+1}$ conductor to the $B_{4k}$ conductor are distributed in the second region. The first branch is distributed successively in the first region, the second region, and the third region, and the second branch is distributed successively in the first region, the third region, and the second region. In this way, the maximum voltage drop between adjacent out-of-phase conductors can be reduced, improving the insulation reliability of the stator winding, reducing the internal loss of the motor, and improving the energy conversion efficiency of the motor. Further, the above structure constitutes a short-pitch winding, which can reduce winding harmonics, suppress torque ripple, improve noise vibration, and improve efficiency.

In some embodiments, the $A_1$ conductor and the $B_1$ conductor are located in one winding slot of the plurality of winding slots. Incoming ends of the two branches are arranged in the same winding slot, which can facilitate connection with an external device such as a bus bar, and can improve installation efficiency of the stator.

In some embodiments, the $A_1$ conductor is a conductor of the $L_1$ conductor layer in the one winding slot, and the $B_1$ conductor is a conductor of the $L_n$ conductor layer in the one winding slot. The incoming ends of the first branch and the second branch are respectively arranged at a slot bottom layer and an opening layer of the same winding slot, to facilitate connection of the bus bar.

In some embodiments, the $A_{4k}$ conductor is a conductor of the $L_1$ conductor layer in the one winding slot, and the $B_{4k}$ conductor is a conductor of the $L_n$ conductor layer in the one winding slot. Outgoing ends of the first branch and the second branch are respectively arranged at a slot bottom layer and an opening layer of the same winding slot, to facilitate the connection of the bus bar.

In some embodiments, the first branch includes a first positive lead connected to the $A_1$ conductor and a first negative lead connected to the $A_{4K}$ conductor, and the second branch includes a second positive lead connected to the $B_1$ conductor and a second negative lead connected to the $B_{4K}$ conductor. The positive electrode lead and the negative electrode lead can extend out of the winding slot, improving convenience of welding the incoming ends and the outgoing ends, and facilitating connection of an external component to the first branch and the second branch.

In some embodiments, the first branch includes at least one first single-conductor plug connector and a plurality of first dual-conductor plug connectors. Each of the at least one first single-conductor plug connector includes one conductor, and each of the plurality of first dual-conductor plug connectors includes two conductors. The first branch of the embodiments of the present disclosure employs a combination of different types of plug connectors, such that the winding manner of the first branch can be more flexible.

In some embodiments, the at least one first single-conductor plug connector includes two first single-conductor plug connectors. One of the two first single-conductor plug connectors includes the $A_1$ conductor, and another one of the two first single-conductor plug connectors includes the $A_{4k}$ conductor. The two first single-conductor plug connectors can respectively serve as a incoming end conductor and an outgoing end conductor, facilitating connection of the first branch to an external component.

In some embodiments, the plurality of first dual-conductor plug connectors includes a first plug connector, a second plug connector, and a third plug connector. A span between two conductors of the first plug connector is equal to a pole pitch, a span between two conductors of the second plug connector is smaller than the pole pitch, and a span between two conductors of the third plug connector is greater than the pole pitch. The plug connectors with different spans can adapt to the connections among the conductors with different spans, and adapt to different conductor connection manners.

In some embodiments, the $A_{2k}$ conductor and the $A_{2k+1}$ conductor are the two conductors of the third plug connector, respectively, and the $A_{3k}$ conductor and the $A_{3k+1}$ conductor are the two conductors of the second plug connector, respectively. When the first branch spans from the first region to the second region, the first branch spans over a long pitch by means of the third plug connector. When the first branch spans from the second region to the third region, the first branch spans over a short pitch by means of the second plug connector. The above-mentioned structure can improve efficiency of the plug-in mounting of the conductors.

In some embodiments, the second branch includes at least one second single-conductor plug connector and a plurality of second dual-conductor plug connectors. Each of the at least one second single-conductor plug connector includes one conductor, and each of the plurality of second dual-conductor plug connectors includes two conductors. The at least one second single-conductor plug connector includes two second single-conductor plug connectors, one of the two second single-conductor plug connectors includes the $B_1$ conductor, and another one of the two second single conductor plug connectors includes the $B_{4k}$ conductor. The plurality of second dual-conductor plug connectors includes a fourth plug connector, a fifth plug connector, and a sixth plug connector. A span between two conductors of the fourth plug connector is equal to a pole pitch, a span between two conductors of the fifth plug connector is smaller than the pole pitch, and a span between two conductors of the sixth plug connector is smaller than the span between the two conductors of the fifth plug connector.

In the second branch, the second single-conductor plug connector can facilitate the welding of the second positive lead and the second negative lead, and the second dual-conductor plug connectors can be respectively arranged in the two winding slots to reduce the occupied space, such that the structure of the stator is more compact. The two second single-conductor plug connectors can serve as an incoming end conductor and an outgoing end conductor, respectively, to facilitate connection of the second branch to an external bus bar. The plug connectors with different spans can adapt to the connection among the conductors with different spans, and adapt to different conductor connection manners.

In some embodiments, the $B_{2k}$ conductor and the $B_{2k+1}$ conductor are the two conductors of the fifth plug connector, respectively, and the $B_{3k}$ conductor and the $B_{3k+1}$ conductor are the two conductors of the sixth plug connector, respectively.

When the second branch spans from the first region to the third region, the second branch spans over a short pitch by means of the fifth plug connector. When the second branch spans from the second region to the third region, the second branch spans over a short pitch by means of the sixth plug connector. The above-mentioned structure can improve the efficiency of the plug-in mounting of the conductors.

In some embodiments, the stator winding includes three phase windings in a star-type connection or a triangle-type connection.

In some embodiments, the number of the plurality of winding slots is a multiple of twelve.

In some embodiments, the stator iron core has forty-eight winding slots, eight conductor layers are arranged in each of the plurality of winding slots, and the stator has eight poles.

In a second aspect, embodiments of the present disclosure provide a motor including the stator of any one of the embodiments as described above.

In a third aspect, embodiments of the present disclosure provide an electric device including the motor of any one of the embodiments as described above.

DETAILED DESCRIPTION OF THE EMBODIMENTS

In order to more clearly illustrate the technical solutions of the embodiments of the present disclosure, a brief description will be given below of the accompanying drawings, which are required to be used in the description of the embodiments. It is obvious that the drawings in the description below are only some embodiments of the present disclosure, and it would be obvious for those skilled in the art to obtain other drawings based on the drawings without involving any inventive effort.

FIGS. 10A-10I are schematic diagrams of one phase winding of a stator according to some embodiments of the present disclosure.

FIGS. 11A-11C are schematic diagrams of three phase windings of a stator according to some embodiments of the present disclosure.

Figure 1:
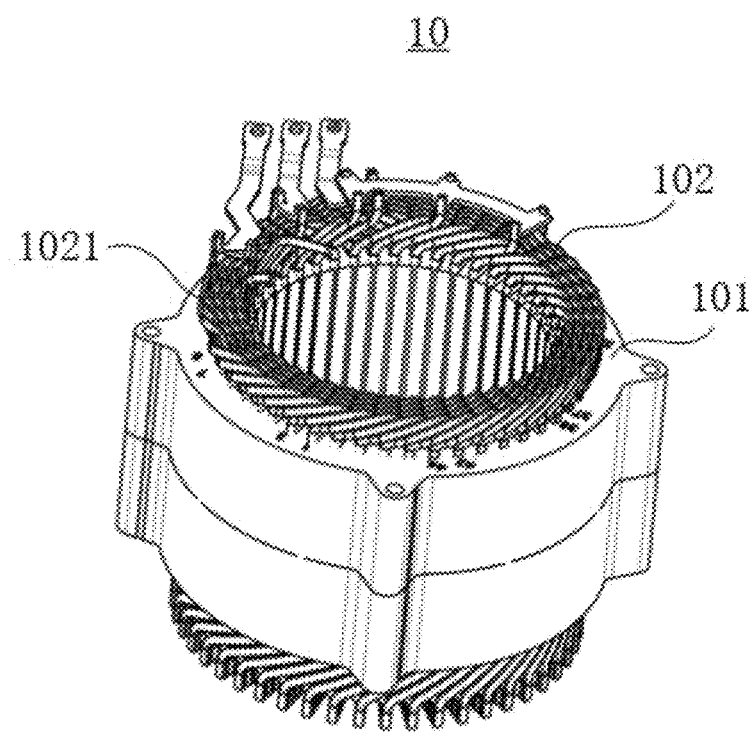
FIG. 1 is a schematic structural diagram of a stator of a motor according to some embodiments of the present disclosure.

The drawings are not drawn at actual scale.

DESCRIPTION OF EMBODIMENTS

In order to make the purpose, technical solution and advantages of the embodiments of the present disclosure clearer, the following will provide a clear description of the technical solution in combination with the accompanying drawings in embodiments of the present disclosure. Obviously, the described embodiments are some of the embodiments of the present disclosure, rather than all of them. Based on the embodiments of the present disclosure, all other embodiments obtained by those skilled in the art without any inventive effort fall within the scope of the present disclosure.

Unless otherwise defined, all technical and scientific terms used herein have the same meaning as commonly understood by those skilled in the art of the present disclosure. Terms in a specification of the present disclosure herein are only used for the purpose of describing specific embodiments, and are not intended to limit the present disclosure. The terms "including", "having" and any variation thereof in the description and claims of the present disclosure and in the preceding description of the figures are intended to cover non-exclusive inclusion. In the specification and claims of the present disclosure or in the above-mentioned drawings, the terms "first", "second" and the like are used to distinguish different objects, rather than describing a particular order.

In the present disclosure, reference to "embodiment" means that a particular feature, structure, or characteristic described in conjunction with the embodiment or implementation may be included in at least one embodiment of the present disclosure. The presence of the term at each place in the specification does not necessarily refer to the same embodiment, nor does it refer to a separate or alternative embodiment that is mutually exclusive of other embodiments.

In the description of the present disclosure, it should be noted that, unless expressly stated or limited otherwise, the terms "mounted", "connected", "coupled" and "attached" are to be interpreted broadly, and may, for example, be fixedly connected, detachably connected, or integrally connected, may be directly connected or indirectly connected through an intermediate medium, and may be communication between two elements. The specific meaning of the above terms in the present disclosure can be understood by those skilled in the art.

In the present disclosure, the term "and/or" only represents a relationship between correlated objects, including three relationships. For example, "A and/or B" may mean three situations: A only, B only, or both A and B. In addition, the character "/" in the present disclosure generally represents an "or" relationship between the correlated objects preceding and succeeding the symbol.

In the embodiments of the present disclosure, the same reference numerals denote the same components, and a detailed description of the same components is omitted in different embodiments for the sake of brevity. It is to be understood that the thickness, length, width and other dimensions of the various components in the embodiments of the present disclosure illustrated in the figures, as well as the overall thickness, length, width, and other dimensions of the integrated device, are illustrative only and should not be construed to limit the present disclosure in any way.

The term "a plurality of" as used herein refers to two or more (including two).

In a driving motor of a new energy vehicle, in order to increase the slot space factor of the motor and increase the power density and the torque density, multiple conductor layers may be arranged in winding slots of a stator winding of the motor, and the conductors are connected to form the stator winding. The stator winding is usually in the form of full-pitch winding or short-pitch winding.

The inventor has found that in the related art, the harmonic content of the full-pitch winding is high, and the voltage drop among the in-phase conductors in the slot is large, which reduces the insulation reliability and the energy conversion efficiency of the motor. An in-phase voltage drop and an out-of-phase voltage drop in slots of the short-pitch winding are large, such that insulation reliability is low and internal loss of motor is great.

Based on the above reasons, the inventors have studied and designed a stator, which can effectively reduce the voltage drop between two adjacent out-of-phase conductors in the same winding slot and the voltage drop among the in-phase conductors in the same winding slot by changing the winding manner of the stator winding to improve the insulation reliability of the stator winding.

For ease of understanding, the terms used in the present disclosure are defined as follows.

A stator refers to a stationary part of the motor, which acts to generate a rotating magnetic field.

A rotor refers to a rotary component of the motor, which acts to realize conversion between electric energy and mechanical energy.

A span refers to a distance over which two sides of the same component of the motor winding span on an armature surface, and is represented by the number of winding slots formed on a stator iron core.

P denotes the number of magnetic pole pairs, which is referred to as the number of pole pairs. Magnetic poles formed by energization of the motor windings appear as pairs of N and S poles. The total number of the poles is 2P.

A pole pitch refers to a distance occupied by each of the poles of the motor along a circumferential surface of an air gap. The pole pitch may be represented by the number of the winding slots of the stator iron core. In an embodiment, the pole pitch is Z/2P, and Z is the total number of the winding slots of the stator iron core.

A pole phase group is formed by connecting in series a plurality of coils belonging to an in-phase winding at a pole pitch in an alternating current motor and is also referred to as a coil group. The current directions and the electromagnetic effects of coils of the pole phase group are the same, and the coils collectively generate a magnetic pole in the phase winding.

A phase winding refers to a set of windings consisting of at least one parallel branch connected in series and in parallel in a prescribed manner. Conductors in a phase winding typically span pole pitches, and the coils are interconnected and integrated.

Figure 2:
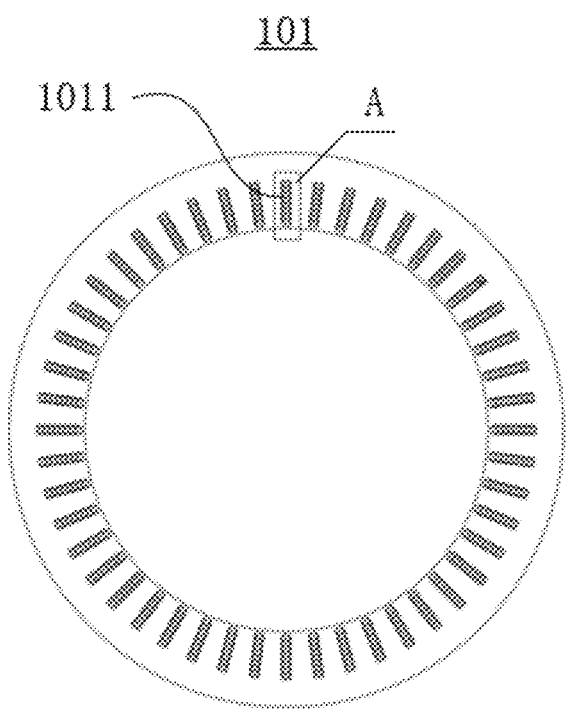
FIG. 2 is a schematic sectional diagram of a stator according to some embodiments of the present disclosure.
Figure 3:
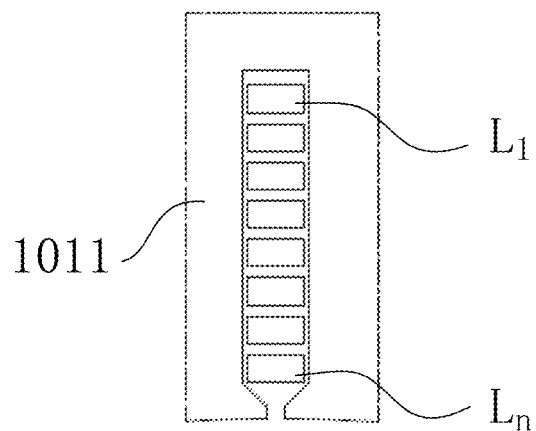
FIG. 3 is a schematic enlarged diagram of a section A in FIG. 2.
Figure 4:
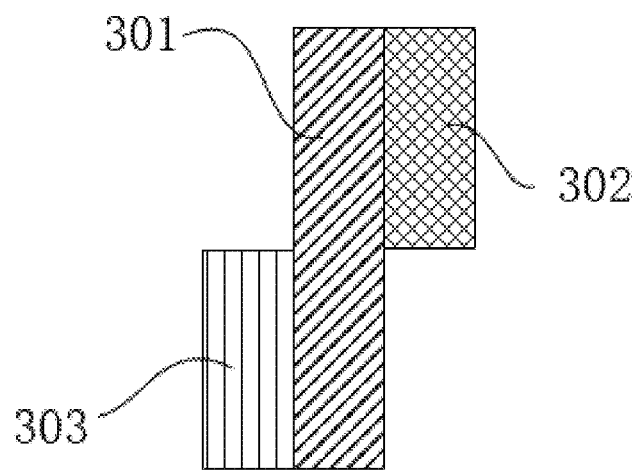
FIG. 4 is a schematic distribution diagram of a first region, a second region, and a third region according to some embodiments of the present disclosure.
Figure 5:
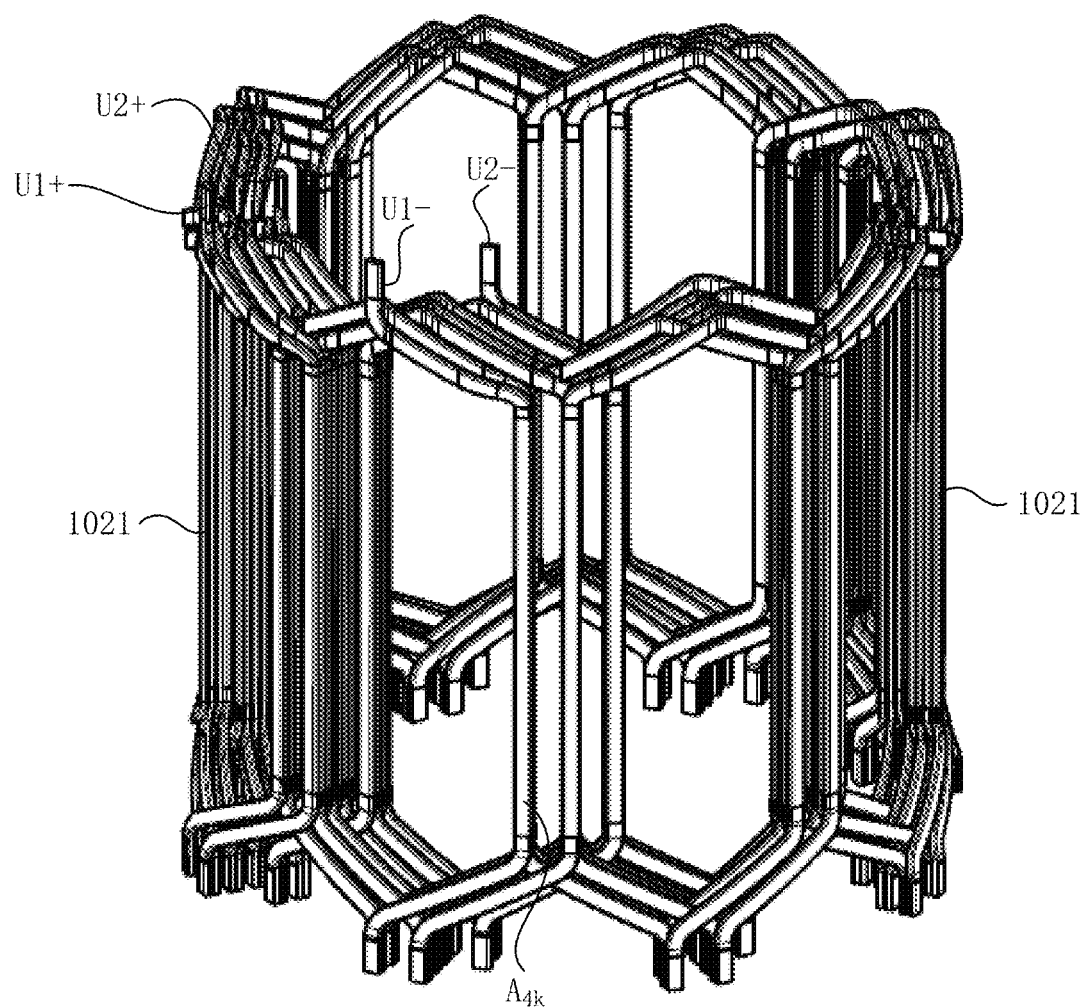
FIG. 5 is a schematic diagram of pole phase groups of a phase winding of a stator winding according to some embodiments of the present disclosure.

FIG. 1 is a schematic structural diagram of a stator of a motor according to some embodiments of the present disclosure. FIG. 2 is a schematic sectional diagram of a stator according to some embodiments of the present disclosure. FIG. 3 is a schematic enlarged diagram of a section A in FIG. 2. FIG. 4 is a schematic distribution diagram of a first region, a second region, and a third region according to some embodiments of the present disclosure. FIG. 5 is a schematic diagram of pole phase groups of a phase winding of a stator winding according to some embodiments of the present disclosure.

As shown in FIGS. 1 and 2, some embodiments of the present disclosure provide a stator 10 of a motor. The stator 10 includes a stator iron core 101 and a stator winding 102 provided at the stator iron core 101. The stator iron core 101 has a plurality of winding slots 1011 formed in an inner wall thereof. The stator winding 102 includes conductors 1021 inserted in the plurality of winding slots 1011. Referring to FIG. 3, n conductor layers 1021 are arranged in each of the plurality of winding slots 1011, where n is a positive even number. The n conductor layers are denoted as an $L_1$ conductor layer, an $L_2$ conductor layer . . . and an $L_n$ conductor layer in a direction in which a bottom of the winding slot 1011 is directed towards an opening of the winding slot 1011.

Referring to FIG. 4 in combination, the stator winding 102 includes a plurality of phase windings. Each of the plurality of phase winding includes a plurality of pole phase groups. Each of the plurality of pole phase groups of the phase winding includes a first region 301, a second region 302, and a third region 303. The second region 302 and the third region 303 are located at two sides of the first region 301, respectively. The $L_1$ conductor layer 1021 to the $L_n$ conductor layer 1021 are located in the first region 301, an $L_{n/2+1}$ conductor layer 1021 to the $L_n$ conductor layer 1021 are located in the second region 302, and the $L_1$ conductor layer 1021 to an $L_{n/2}$ conductor layer 1021 are located in the third region.

The phase winding includes a first branch U1 and a second branch U2. The first branch U1 includes 4k conductors 1021 sequentially connected in series, where k is a positive integer. The 4k conductors 1021 of the first branch U1 are denoted as an $A_1$ conductor, . . . an $A_{2k}$ conductor, . . . and an $A_{4k}$ conductor. The second branch U2 includes 4k conductors 1021 sequentially connected in series, and the 4k conductors 1021 of the second branch U2 are denoted as a $B_1$ conductor, . . . a $B_{2k}$ conductor, . . . and a $B_{4k}$ conductor.

The $A_1$ conductor to the $A_{2k}$ conductor and the $B_1$ conductor to the $B_{2k}$ conductor are arranged in the first region 301. Some of an $A_{2k+1}$ conductor to the $A_{4k}$ conductor are arranged in the second region 302, and the remaining of the $A_{2k+1}$ conductor to the $A_{4k}$ conductor are arranged in the third region 303. Some of a $B_{2k+1}$ conductor to the $B_{4k}$ conductor are arranged in the second region 302, and the remaining of the $B_{2k+1}$ conductor to the $B_{4k}$ conductor are arranged in the third region 303.

In an embodiment, the $A_{2k+1}$ conductor to an $A_{3k}$ conductor are arranged in the second region 302, and the $A_{3k+1}$ conductor to the $A_{4k}$ conductor are arranged in the third region 303. The $B_{2k+1}$ conductor to a $B_{3k}$ conductor are arranged in the third region 303, and the $B_{3k+1}$ conductor to the $B_{4k}$ conductor are arranged in the second region 302.

Figure 6:
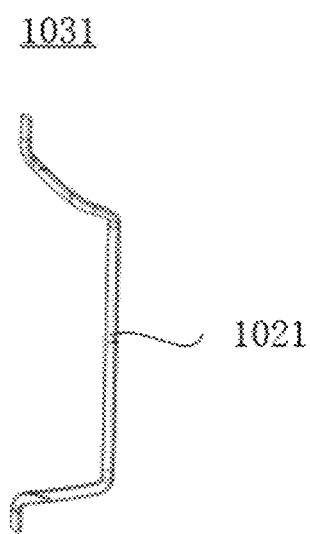
FIG. 6 is a schematic structural diagram of a first single-conductor plug connector of a stator according to some embodiments of the present disclosure.

In an embodiment, the number n of the conductors 1021 in the winding slot 1011 may be two, four, six, eight, sixteen, or thirty-two. The number of the winding slots 1011 can be determined based on the number of the phase windings of the stator 10, and can be adapted to different voltage and power ranges in an application range of winding design. In some embodiments, as shown in FIG. 6, n is eight. In an embodiment, the $L_1$ conductor layer to an $L_8$ conductor layer are also referred to as a conductor layer, b conductor layer, c conductor layer, d conductor layer, e conductor layer, f conductor layer, g conductor layer, and h conductor layer, respectively.

Embodiments of the present disclosure do not limit the shape of the conductor 1021. In an embodiment, a section of the conductor 1021 may have a circular shape, a rectangular shape, an elliptical shape, a racetrack shape, or the like. In an exemplary embodiment of the present disclosure, the section of the conductor 1021 is in a rectangular shape, such that a cross-sectional area of the conductor 1021 can be increased to be adapted to the rectangular wiring slot of the iron core, thereby improving the slot space factor of the stator iron core. The rectangular conductor 1021 may also be referred to as a flat wire conductor.

In an embodiment, the plurality of winding slots 1011 is arranged at intervals along a circumferential direction of the stator iron core 101. In an exemplary embodiment of the present disclosure, the plurality of winding slots 1011 is uniformly arranged along the circumferential direction of the stator iron core 101. In other words, the plurality of winding slots 1011 is arranged at equal intervals in the circumferential direction.

The stator winding includes a plurality of phase windings, and the number of the phase windings may be two, three, four, or five. In other embodiments of the present disclosure, the number of the phase windings may be greater than five. The stator of the embodiments of the present disclosure is applicable to motors with different number of phases, and can be adapted to different voltage and power ranges.

The number of the plurality of pole phase groups of the phase winding is a positive even number. The first region 301, the second region 302 and the third region 303 of each of the plurality of pole phase groups are arranged at three different winding slots 1011. In an embodiment, the second region 302 is located at a side of the first region 301 in a clockwise direction, and the third region 303 is located at a side of the first region 301 in a counterclockwise direction. In another embodiment of the present disclosure, the second region 302 is located at a side of the first region 301 in the counterclockwise direction, and the third region 303 is located at a side of the first region 301 in the clockwise direction.

Each of the plurality of phase windings may include a plurality of branches. The plurality of branches of the phase winding may be referred to as parallel branches. The number of branches of a phase winding may be any integer to extend the application range of winding design to accommodate different voltage and power ranges. In an embodiment, the phase winding of an embodiment of the present disclosure includes a first branch U1 and a second branch U2 connected in parallel. The phase winding may include one or more first branch U1 and one or more second branch U2.

In an embodiment, the $A_1$ conductor, . . . , $A_{2k}$ conductor, . . . , and $A_{4k}$ conductor are connected sequentially in series from a positive pole to a negative pole of the first branch U1. The $B_1$ conductor, . . . , $B_{2k}$ conductor, . . . , and $B_{4k}$ conductor are connected sequentially in series from a positive pole to a negative pole of the second branch U2.

The inventor has noted that within the same winding slot 1011, the voltage drop between adjacent in-phase conductors 1021 is related to a difference between reference numbers of the adjacent in-phase conductors 1021. In an embodiment, two adjacent in-phase conductors 1021 in the same winding slot 1011 are $A_x$ and $B_y$, respectively, where $1 \leq x \leq 4k$ and $1 \leq y \leq 4k$. The greater the value of |x−y| is, the greater the voltage drop between the two adjacent in-phase conductors 1021 is, and the higher insulation requirements of the motor on the stator winding are.

In the embodiment of the present disclosure, the reference numbers of the conductors 1021 arranged in the first region 301 do not exceed 2k, and thus the difference between the reference numbers of two adjacent in-phase conductors 1021 is smaller than 2k. In this way, the maximum voltage drop between the adjacent in-phase conductors 1021 in the first region 301 can be reduced, thereby improving the insulation reliability of the stator winding, reducing the internal loss of the motor, and improving the energy conversion efficiency of the motor.

The reference numbers of the conductors 1021 arranged in the second region 302 and the third region 303 both exceed 2k and thus the difference between reference numbers of adjacent in-phase conductors 1021 is smaller than 2k. In this way, the maximum voltage drop between adjacent in-phase conductors 1021 in the second region 302 and the maximum voltage drop between adjacent in-phase conductors 1021 in the third region 303 can be reduced, thereby improving the insulation reliability of the stator winding, reducing the internal loss of the motor, and improving the energy conversion efficiency of the motor.

In the embodiment of the present disclosure, the second region 302 occupies only a part of the winding slot 1011, and the third region 303 occupies only a part of the winding slot 1011, such that the phase winding takes the form of a short-pitch winding. The short-pitch winding can reduce winding harmonics, and improve torque ripple and noise vibration of the motor.

Since the phase windings of the embodiments of the present disclosure take the form of short-pitch windings, adjacent out-phase conductors may be present in some of the winding slots 1011. In an embodiment, a second region 302 of one phase winding and a third region 303 of another phase winding are arranged in the same winding slot 1011.

The inventor has noted that the voltage drop between adjacent out-of-phase conductors in the same winding slot 1011 is related to the sum of the reference numbers of the conductors 1021. In an embodiment, two adjacent in-phase conductors in the same winding slot 1011 are respectively an $A_x$ conductor and an $A_y$ conductor, which are also possible to be a $B_x$ conductor and a $B_y$ conductor or an $A_x$ conductor and a $B_y$ conductor, where $1 \leq x \leq 4k$ and $1 \leq y \leq 4k$. The smaller the value of x+y is, the greater the voltage drop between the adjacent out-of-phase conductors, and the higher the insulation requirements of the motor on the stator winding are.

In the embodiment of the present disclosure, the reference numbers of the conductors arranged in the second region 302 and the third region 303 exceed 2k, and thus the reference numbers of conductors that are located in the same winding slot 1011 and belong to different phase windings are greater than 2k. In this way, the sum of the reference numbers of adjacent out-of-phase conductors is greater than 4k, thereby reducing the maximum voltage drop between the adjacent out-of-phase conductors, improving the insulation reliability of the stator winding, reducing the internal loss of the motor, and improving the energy conversion efficiency of the motor.

In some embodiments of the present disclosure, each of the plurality of winding slots 1011 extends in an axial direction of the stator iron core 101 and extends through the stator iron core 101 in the axial direction of the stator iron core 101.

In an embodiment of the present disclosure, the number of the plurality of winding slots 1011 is 12 M, where M is a positive integer.

In some embodiments of the present disclosure, the stator winding may include three phase windings, i.e., a first phase winding, a second phase winding, and a third phase winding. In an embodiment, the first phase winding is a U phase winding, the second phase winding is a V phase winding, and the third phase winding is a W phase winding.

In some embodiments of the present disclosure, the $A_{2k+1}$ conductor to the $A_{3k}$ conductor are arranged in the second region 302, and the $A_{3k+1}$ conductor to the $A_{4k}$ conductor are arranged in the third region 303. The $B_{2k+1}$ conductor to the $B_{3k}$ conductor are arranged in the third region 303, and the $B_{3k+1}$ conductor to the $B_{4k}$ conductor are arranged in the second region 302.

In the present disclosure, the second region 302 and the third region 303 both have a conductor 1021 with a reference number greater than 3k. Accordingly, the sum of reference numbers of adjacent out-of-phase conductors can be increased, thereby reducing the maximum voltage drop between the adjacent out-of-phase conductors, improving the insulation reliability of the stator winding, reducing the internal loss of the motor, and improving the energy conversion efficiency of the motor.

In some embodiments of the present disclosure, the first branch U1 is formed by winding phase windings sequentially in a wave winding form in an order of the first region 301 of the plurality of pole phase groups, the second region 302 of the plurality of pole phase groups, and the third region 303 of the plurality of pole phase groups. The second branch U2 is formed by winding phase windings sequentially in the wave winding form in an order of the first region 301 of the plurality of pole phase groups, the third region 303 of the plurality of pole phase groups, and the second region 302 of the plurality of pole phase groups.

The first branch U1 and the second branch U2 are both formed by winding phase windings in the wave winding form, such that connection wires among the conductors 1021 can be reduced and the winding process of the stator winding can be simplified.

In some embodiments of the present disclosure, the $A_1$ conductor and the $B_1$ conductor are located in the same winding slot 1011. Incoming ends of the two branches are arranged in the same winding slot 1011, which can facilitate connection with an external component such as a bus bar, and improve the efficiency of stator installation.

In some embodiments of the present disclosure, the $A_1$ conductor is a conductor 1021 of the $L_1$ conductor layer in the winding slot 1011, and the $B_1$ conductor is a conductor 1021 of the $L_n$ conductor layer in the winding slot. The incoming ends of the first branch U1 and the second branch U2 are respectively disposed at a bottom layer and an opening layer of the same winding slot 1011, to facilitate the connection of the bus bar.

In some embodiments of the present disclosure, the $A_{4k}$ conductor is a conductor 1021 of the $L_1$ conductor layer in the winding slot 1011. The $B_{4k}$ conductor is a conductor 1021 of the $L_n$ conductor layer in the winding slot. Outgoing ends of the first branch U1 and the second branch U2 are respectively disposed at a bottom layer and an opening layer of the same winding slot 1011, to facilitate the connection of the bus bar.

FIG. 5 is a schematic diagram of a phase winding according to an embodiment of the present disclosure. As shown in FIG. 5, in some embodiments of the present disclosure, the first branch U1 includes a first positive lead U1+ connected to the $A_1$ conductor and a first negative lead U1− connected to the $A_{4K}$ conductor. The second branch U2 includes a second positive lead U2+ connected to the $B_1$ conductor and a second negative lead U2− connected to the $B_{4K}$ conductor. The first positive lead U1+, the first negative lead U1−, the second positive lead U2+, and the second negative lead U2− may extend out of the winding slot 1011, and can facilitate an connection of an external component to the first branch U1 and the second branch U2.

In some embodiments of the present disclosure, the first branch U1 includes a plurality of plug connectors connected in series. Each of the plurality of plug connectors includes at least one conductor 1021.

Figure 7:
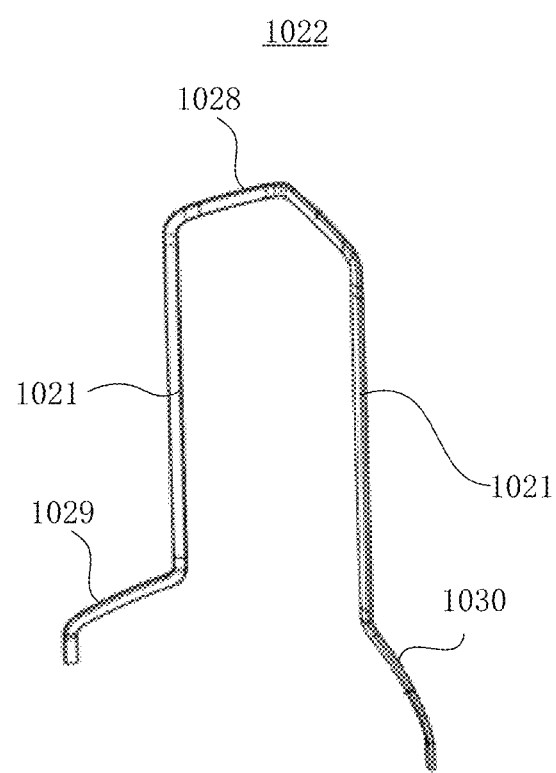
FIG. 7 is a schematic structural diagram of a first dual-conductor plug connector of a stator according to some embodiments of the present disclosure.

As shown in FIGS. 6 and 7, in some embodiments of the present disclosure, the first branch U1 includes at least one first single-conductor plug connector 1031 and a plurality of first dual-conductor plug connectors 1022. Each of the at least one first single-conductor plug connector 1031 includes one conductor 1021, and each of the plurality of first dual-conductor plug connectors includes two conductors 1021. The conductor 1021 of the first single-conductor plug connector 1031 and the two conductors 1021 of the first dual-conductor plug connector 1022 are different conductors in the first branch U1.

The first branch U1 of the embodiment of the present disclosure employs a combination of different kinds of plug connectors, such that the winding manner of the first branch U1 can be more flexible.

In some embodiments, the first dual-conductor plug connector 1022 may include a connection portion 1028 that connects the two conductors 1021.

In some embodiments, the two conductors 1021 of the first dual-conductor plug connector 1022 may be connected by welding. In an embodiment, when a span between the two conductors 1021 is small, e.g., a spacing between the two conductors 1021 is smaller than or equal to two winding slots, the two conductors 1021 may be connected by direct welding.

In some embodiments, the first dual-conductor plug connector 1022 further includes two extension portions. One of the two extension portions extends from an end of one of the two conductors away from the connection portion, and another one of the two extension portions extends from an end of another one of the two conductors away from the connection portion. The two extension portions extend out of the winding slot 1011 to facilitate connection to other plug connectors.

In an embodiment, the first dual-conductor plug connector 1022 may be a hairpin coil. Before being inserted into the winding slot 1011, the first dual-conductor plug connector 1022 may include two linear edges. The two linear edges are inserted into the winding slot 1011 from an end of the stator iron core. Two parts of the two linear edges received in the winding slot 1011 form the two conductors 1021, respectively. Two parts of the two linear edges that protrude from another end of the stator iron core form the two extension portions.

The two extension portions are a first extension portion 1029 and a second extension portion 1030, respectively. The first extension portion 1029 and the second extension portion 1030 are both disposed at a welding end of the stator winding. After the dual-conductor plug connector is inserted into the stator iron core, the first extension portion 1029 and the second extension portion 1030 may be bent to facilitate welding of the first extension portion 1029 and the second extension portion 1030 to other plug connectors.

In some embodiments of the present disclosure, the first branch U1 includes two first single-conductor plug connectors 1031. One of the two first single-conductor plug connectors 1031 includes the $A_1$ conductor, and another one of the two first single-conductor plug connectors 1031 includes the $A_{4k}$ conductor. The two first single-conductor plug connectors 1031 can serve as an incoming end conductor and an outgoing end conductor, respectively, facilitating the connection of the first branch U1 to an external component such as a bus bar.

In some embodiments of the present disclosure, the plurality of first dual-conductor plug connectors 1022 includes a first plug connector, a second plug connector, and a third plug connector. A span between two conductors of the first plug connector is equal to a pole pitch. A span between two conductors 1021 of the second plug connector is smaller than the pole pitch. A span between two conductors 1021 of the third plug connector is greater than the pole pitch.

The plurality of first dual-conductor plug connectors 1022 may be divided into various kinds of plug connectors based on different spans. The first plug connector is a first dual-conductor plug connector 1022 with a span equal to the pole pitch. The second plug connector may be the first dual-conductor plug connector 1022 with a span smaller than the pole pitch. The third plug connector may be the first dual-conductor plug connector 1022 with a span greater than the pole pitch.

The plug connectors 1022 with different spans can accommodate the connections among the conductors 1021 with different spans, and accommodate different conductor connection manners. It will be appreciated that the first, second, and third plug connectors are all configured as shown in FIG. 6, with the difference that the span between the two conductors 1021 in different plug connectors is different.

In some embodiments of the present disclosure, the number of the third plug connectors is one. The third plug connector includes two conductors 1021 (i.e., the $A_{2k}$ conductor and the $A_{2k+1}$ conductor) and a connection portion 1028 connecting the two conductors 1021. The number of the second plug connectors is one. The second plug connector includes two conductors 1021 (i.e., the $A_{3k}$ conductor and the $A_{3k+1}$ conductor) and a connection portion 1028 connecting the two conductors 1021. The number of the first plug connectors is plural. The first plug connectors include two adjacent conductors 1021 sequentially connected among the A 2 conductor to an $A_{2k-1}$ conductor, an $A_{2k+2}$ conductor to an $A_{3k+1}$ conductor, and an $A_{3k+2}$ conductor to the $A_{4k}$ conductor, and a plurality of connection portions 1028 each of which connected between adjacent two conductors 1021.

When the first branch U1 spans from the first region 301 to the second region 302, the first branch U1 spans over a long pitch by means of the third plug connector. When the first branch U1 spans between the second region 302 and the third region 303, the first branch U1 spans over a short pitch by means of the second plug connector. The above structure can improve the efficiency of the plug-in mounting of the conductor.

Figure 8:
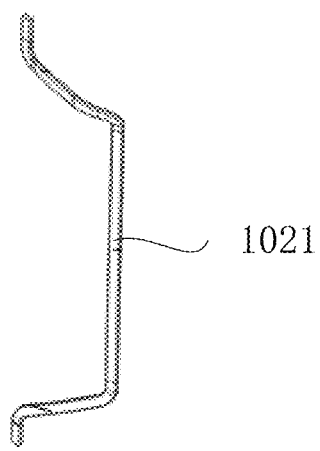
FIG. 8 is a schematic structural diagram of a second single-conductor plug connector of a stator according to some embodiments of the present disclosure.
Figure 9:
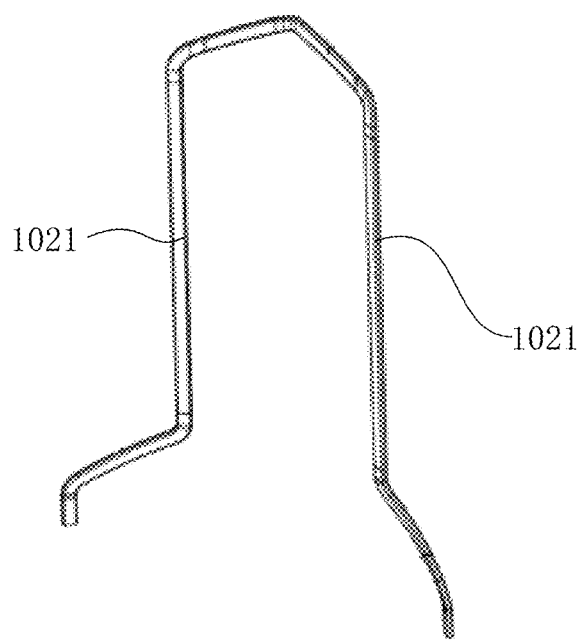
FIG. 9 is a schematic structural diagram of a second dual-conductor plug connector of a stator according to some embodiments of the present disclosure.
Figure 10A:
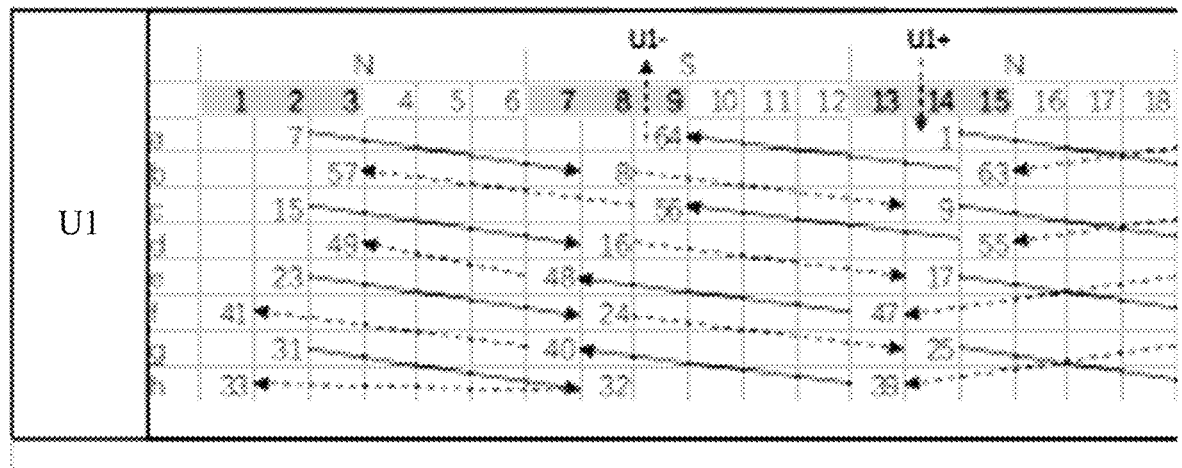
Figure 10B:
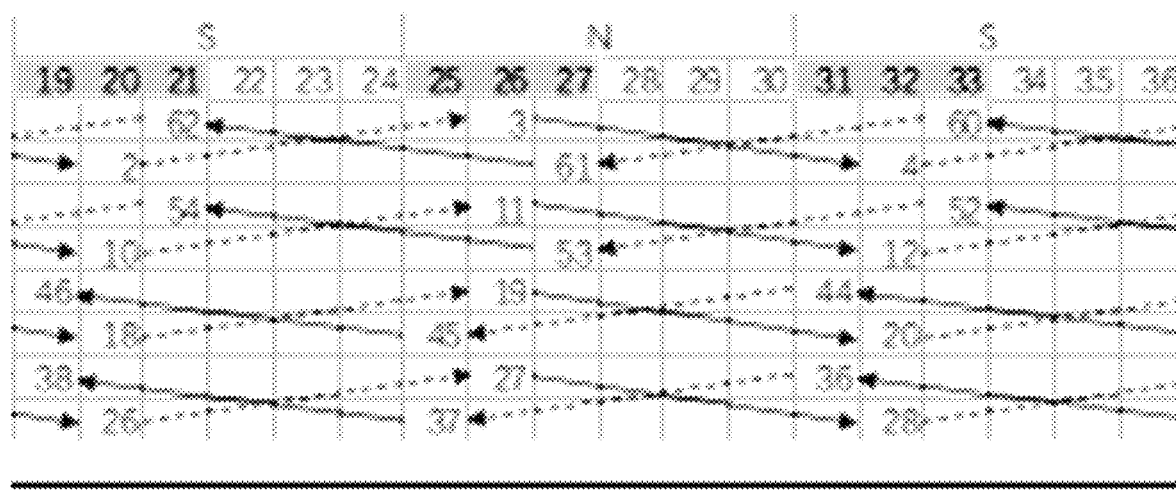
Figure 10C:
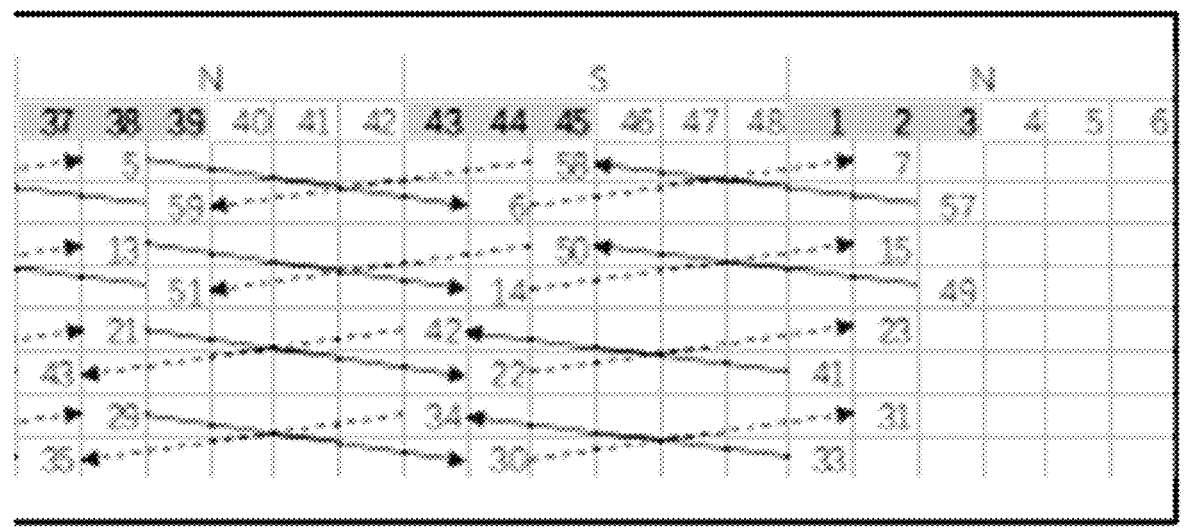
Figure 10D:
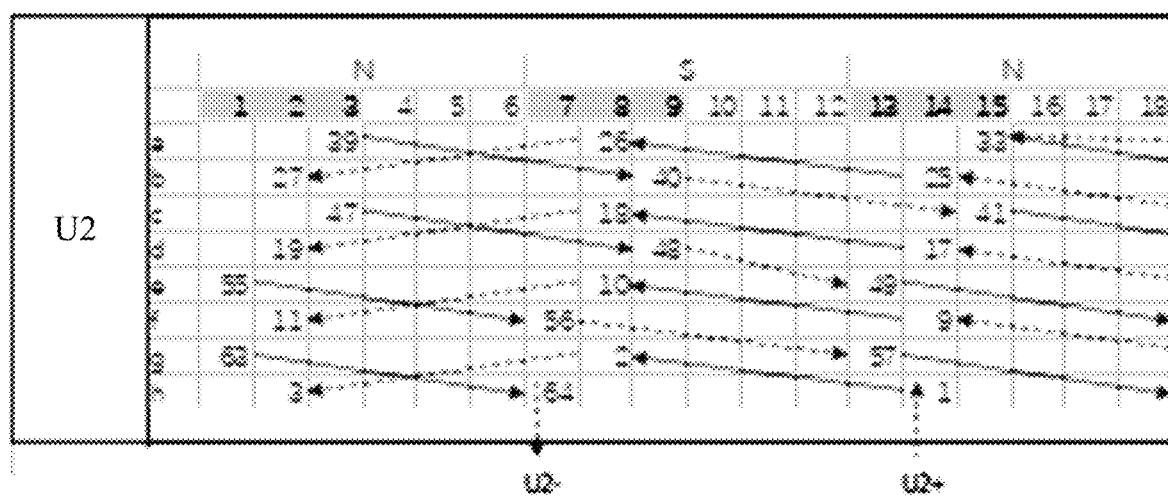
Figure 10E:
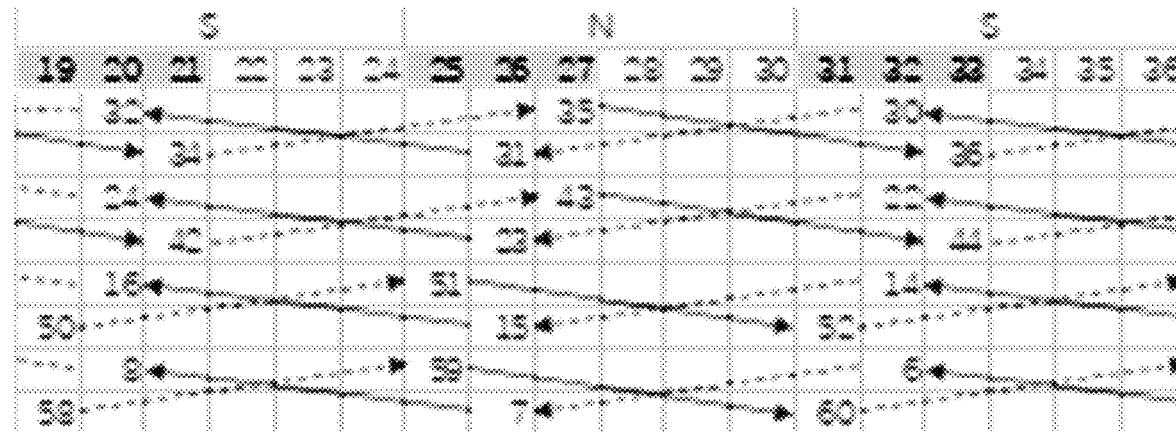
Figure 10F:
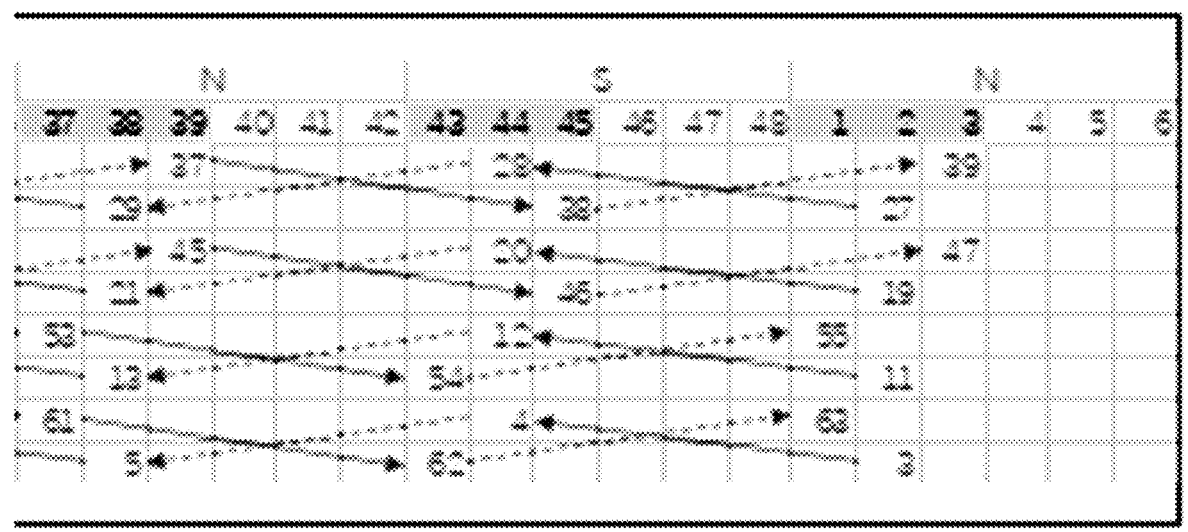

As shown in FIGS. 8 and 9, in some embodiments of the present disclosure, the second branch U2 includes at least one second single-conductor plug connector 1041 and a plurality of second dual-conductor plug connectors 1042. Each of the at least one second single-conductor plug connector 1041 includes one conductor, and each of the plurality of second dual-conductor plug connectors 1042 includes two conductors 1021. The conductor 1021 of the second single-conductor plug connector 1041 and the two conductors 1021 of the second dual-conductor plug connector 1042 are different conductors in the second branch U2.

In some embodiments of the present disclosure, the second branch U2 includes two second single-conductor plug connectors 1041. One of the two second single-conductor plug connectors 1041 includes the $B_1$ conductor, and another one of the two second single-conductor plug connectors 1041 includes the $B_{4k}$ conductor.

In some embodiments of the present disclosure, the plurality of second dual-conductor plug connectors 1041 includes a fourth plug connector, a fifth plug connector, and a sixth plug connector. A span between two conductors 1021 of the fourth plug connector is equal to the pole pitch. A span between two conductors 1021 of the sixth plug connector is smaller than a span between two conductors 1021 of the fifth plug connector. The span between the two conductors 1021 of the fifth plug connector is smaller than the pole pitch.

It will be appreciated that the fourth, fifth, and sixth plug connectors are all configured as shown in FIG. 8, with the difference that the span between the two conductors 1021 in different plug connectors is different.

The plurality of second dual-conductor plug connectors 1042 may be divided into various kinds of plug connectors based on different spans. The fourth plug connector is a second dual-conductor plug connector 1042 with a span equal to the pole pitch. The fifth plug connector may be a second dual-conductor plug connector 1042 with a span smaller than the pole pitch. The third plug connector may be a second dual-conductor plug connector 1042 with a span smaller than the span of the fifth plug connector.

In some embodiments of the present disclosure, the number of the fifth plug connector is one. The fifth plug connector includes two conductors 1021 (i.e., the $B_{2k}$ conductor and the $B_{2k+1}$ conductor) and a connection portion 1028 connecting the two conductors 1021. The number of the sixth plug connector is one. The sixth plug connector includes two conductors 1021 (i.e., the $B_{3k}$ conductor and a $B_{3k+1}$ conductor) and a connection portion 1028 connecting the two conductors 1021. The number of the fourth plug connectors is plural. Each of the fourth plug connectors includes two adjacent conductors 1021 sequentially connected between a $B_2$ conductor to a $B_{2k-1}$ conductor, a $B_{2k+2}$ conductor to a $B_{3k-1}$ conductor, and a $B_{3k+2}$ conductor to the $B_{4k}$ conductor, and a plurality of connection portions 1028 connected between the two adjacent conductors 1021.

In the second branch U2, the second single-conductor plug connector 1041 can facilitate the welding of the second positive lead U2+ and the second negative lead U2−. The second dual-conductor plug connector 1042 can be arranged in two winding slots 1011, respectively, to reduce the occupied space so that the structure of the stator 10 is more compact. The two second single-conductor plug connectors 1041 can serve as an incoming end conductor and an outgoing end conductor, respectively, facilitating the connection of the second branch U2 to an external bus bar. The plug connectors with different spans can adapt to the connections among the conductors 1021 with different spans, and adapt to connection manners of different conductors 1021.

In some embodiments of the present disclosure, the $B_{2k}$ conductor and the $B_{2k+1}$ conductor are the two conductors of the fifth plug connector, and the $B_{3k}$ conductor and the $B_{3k+1}$ conductor are the two conductors 1021 of the sixth plug connector.

When the second branch U2 spans from the first region 301 to the third region 303, the second branch U2 spans over a short pitch by means of the fifth plug connector. When the second branch U2 spans from the second region 302 to the third region 303, the second branch U2 spans over a short pitch by means of the sixth plug connector. The above-mentioned structure can improve the efficiency of the plug-in mounting of the conductors.

In some embodiments of the present disclosure, the stator winding 102 includes three phase windings, and the three phase windings are connected in a star-type connection or a triangle-type connection. Alternatively, the three phase windings are connected in the star-type connection.

In some embodiments of the present disclosure, the number of the winding slots 1011 is a multiple of twelve.

In some embodiments of the present disclosure, the number of the winding slots 1011 is forty-eight, n is eight, and the number of poles of the stator 10 is eight. Each of the poles corresponds to six winding slots 1011.

FIGS. 10A-10I are schematic diagrams of a phase winding of a stator 10 according to some embodiments of the present disclosure. In an embodiment, FIGS. 10A-10I show a U-phase winding. Taking the U-phase winding as an example, the stator winding of the present disclosure is described in detail below.

As shown in [FIG. 10] FIGS. 10A-10I, the U-phase winding includes a plurality of branches, two of which respectively serve as the first branch U1 and the second branch U2.

For ease of understanding, the first table shows the first branch U1, the second table shows the second branch U2, and the third table shows the U-phase winding.

In FIGS. 10A-10I, U1+ represents the first positive lead of the first branch U1, and U1− represents the first negative lead of the first branch U1. U2+ represents the second positive lead of the second branch U2, and U2− represents the second negative lead of the second branch U2.

N and S denote the two poles of the stator 10, respectively. In an embodiment, the stator has eight poles, i.e., four pole pairs.

The stator iron core has a plurality of winding slots 1011, and the plurality of winding slots 1011 is indicated by a row of numbers below the N pole and the S pole. In an embodiment, the stator iron core 101 has forty-eight winding slots 1011. In FIGS. 10A-10I, the forty-eight winding slots are represented by a row of numbers below the N pole and the S pole, i.e., 1 to 48. Each of the poles corresponds to 6 winding slots 1011.

Each of the winding slots 1011 receives a plurality of conductor layers 1021 therein. In an embodiment, in FIG. 7, eight conductors 1021 are received within each of the winding slots 1011. The eight conductors 1021 are located in a a-layer, a b-layer, a c-layer, a d-layer, a e-layer, a f-layer, a g-layer, and a h-layer, respectively.

The branch U1 includes sixty-four conductors 1021 connected sequentially. In FIGS. 10A-10I, the sixty-four conductors 1021 are represented by sixty-four serial numbers arranged in the table. The sixty-four conductors 1021 are connected in sequence in accordance with the serial numbers. Solid arrows in FIGS. 10A-10I indicate manners in which the sixty-four conductors 1021 are connected at a welded end, and dashed arrows indicate manners in which the conductors 1021 are connected at a wiring end.

The first positive lead U1+ is connected to a $1^{st}$ conductor 1021, and the first negative lead U1− is connected to a $64^{th}$ conductor 1021.

In some embodiments of the present disclosure, the $1^{st}$ conductor 1021 to a $32^{nd}$ conductor 1021 of the first branch U1 are sequentially connected in series. The $1^{st}$ conductor 1021, a $3^{rd}$ conductor 1021, a $5^{th}$ conductor 1021, and a $7^{th}$ conductor 1021 are a-layer conductors 1021, and a $2^{nd}$ conductor, a $4^{th}$ conductor, a $6^{th}$ conductor, and an $8^{th}$ conductor are b-layer conductors 1021. A $9^{th}$ conductor, an $11^{th}$ conductor, a $13^{th}$ conductor, and a $15^{th}$ conductor 1021 are c-layer conductors 1021. A $10^{th}$ conductor, a $12^{th}$ conductor, a $14^{th}$ conductor, and a $16^{th}$ conductor 1021 are d-layer conductors 1021. A $17^{th}$ conductor, a $19^{th}$ conductor, a $21^{st}$ conductor, and a $23^{rd}$ conductor 1021 are e-layer conductors 1021. An $18^{th}$ conductor, a $20^{th}$ conductor, a $22^{nd}$ conductor, and a $24^{th}$ conductor 1021 are f-layer conductors 1021. A $25^{th}$ conductor, a $27^{th}$ conductor, a $29^{th}$ conductor, and a $31^{st}$ conductor 1021 are g-layer conductors 1021. A $26^{th}$ conductor, a $28^{th}$ conductor, a $30^{th}$ conductor, and a $32^{nd}$ conductor 1021 are h-layer conductors 1021.

In some embodiments of the present disclosure, a $33^{rd}$ conductor 1021 to the $64^{th}$ conductor 1021 of the first branch U1 are sequentially connected in series. The $33^{rd}$ conductor, a $35^{th}$ conductor, a $37^{th}$ conductor, and a $39^{th}$ conductor 1021 are h-layer conductors 1021, and a $34^{th}$ conductor, a $36^{th}$ conductor, a $38^{th}$ conductor, and a $40^{th}$ conductor 1021 are g-layer conductors 1021. A $41^{st}$ conductor, a $43^{rd}$ conductor, a $45^{th}$ conductor, and a $47^{th}$ conductor 1021 are f-layer conductors 1021. A $42^{nd}$ conductor, a $44^{th}$ conductor, a $46^{th}$ conductor, and a $48^{th}$ conductor 1021 are e-layer conductors 1021. a $49^{th}$ conductor, a $51^{st}$ conductor, a $53^{rd}$ conductor and a $55^{th}$ conductor 1021 are d-layer conductors 1021. A $50^{th}$ conductor, a $52^{nd}$ conductor, a $54^{th}$ conductor, and a $56^{th}$ conductor 1021 are c-layer conductors 1021. A $57^{th}$ conductor, a $59^{th}$ conductor, a $61^{st}$ conductor, and a $63^{rd}$ conductor 1021 are b-layer conductors 1021. A $58^{th}$ conductor, a $60^{th}$ conductor, a $62^{nd}$ conductor, and the $64^{th}$ conductor 1021 are a-layer conductors 1021.

In some embodiments of the present disclosure, the $32^{nd}$ conductor 1021 and the $33^{rd}$ conductor 1021 of the first branch U1 are both h-layer conductors. The conductors 1021 of the same layer that are connected can balance the slot potentials of the branches, and reduce current-circulation loss between the branches.

In some embodiments of the present disclosure, the $1^{st}$ conductor 1021 connected to the first positive lead U1+ is located in a $14^{th}$ winding slot, and the $64^{th}$ conductor 1021 connected to the first negative lead U1− is located in a $9^{th}$ winding slot.

In some embodiments of the present disclosure, the $1^{st}$ conductor 1021 connected to the first positive lead U1+ and the $64^{th}$ conductor 1021 connected to the first negative lead U1− are both a-layer conductors. This embodiment facilitates the arrangement of the bus bars to facilitate connections of the first positive lead U1+ and the first negative lead U1− to components such as bus bars.

In some embodiments of the present disclosure, the stator includes eight poles, and correspondingly, the phase winding includes eight pole phase groups. The sixty-four conductors of the first branch U1 are arranged in the eight pole phase groups to reduce the potential imbalance of the branch due to rotor eccentricity.

In some embodiments of the present disclosure, a span between the conductor 1021 connected to the first positive lead U1+ of the first branch U1 and the conductor 1021 connected to the second positive lead U2+ of the second branch U2 is smaller than or equal to the pole pitch. The embodiments of the present disclosure can reduce a distance between the incoming ends of the two branches, facilitate connection of the incoming ends of the two branches, and facilitate the arrangement of the bus bars and implementation of the winding processing technology.

The second branch U2 includes sixty-four conductors 1021. In FIGS. 10A-10I, the sixty-four conductors 1021 are represented by sixty-four serial numbers arranged in the table. The sixty-four conductors 1021 are connected in sequence in accordance with the serial numbers. The solid arrows in FIGS. 10A-10I indicate the manners in which the sixty-four conductors 1021 are connected at the welded end, and the dashed arrows indicate the manners in which the conductors 1021 are connected at the wiring end.

In FIGS. 10A-10I, U2+ represents the second positive lead, and U2− represents the second negative lead.

In FIG. 10, U2+ represents the second positive lead, and U2− represents the second negative lead.

The second positive lead U2+ is connected to the $1^{st}$ conductor 1021 of the second branch U2, and the second negative lead U2− is connected to the $64^{th}$ conductor 1021 of the second branch U2.

In some embodiments of the present disclosure, the $1^{st}$ conductor 1021 to a $32^{nd}$ conductor 1021 of the second branch U2 are sequentially connected in series. The $1^{st}$ conductor 1021, a $3^{rd}$ conductor 1021, a $5^{th}$ conductor 1021, and a $7^{th}$ conductor 1021 are h-layer conductors 1021, and a $2^{nd}$ conductor, a $4^{th}$ conductor, a $6^{th}$ conductor, and an $8^{th}$ conductor are g-layer conductors 1021. A $9^{th}$ conductor, an $11^{th}$ conductor, a $13^{rd}$ conductor, and a $15^{th}$ conductor 1021 are f-layer conductors 1021. A $10^{th}$ conductor, a $12^{th}$ conductor, a $14^{th}$ conductor, and a $16^{th}$ conductor 1021 are e-layer conductors 1021. A $17^{th}$ conductor, a $19^{th}$ conductor, a $21^{st}$ conductor, and a $23^{rd}$ conductor 1021 are d-layer conductors 1021. An $18^{th}$ conductor, a $20^{th}$ conductor, a $22^{nd}$ conductor, and a $24^{th}$ conductor 1021 are c-layer conductors 1021. A $25^{th}$ conductor, a $27^{th}$ conductor, a $29^{th}$ conductor, and a $31^{st}$ conductor 1021 are b-layer conductors 1021. A $26^{th}$ conductor, a $28^{th}$ conductor, a $30^{th}$ conductor, and a $32^{nd}$ conductor 1021 are a-layer conductors 1021.

In some embodiments of the present disclosure, a $33^{rd}$ conductor 1021 to the $64^{th}$ conductor 1021 of the second branch U2 are sequentially connected in series. The $33^{rd}$ conductor, a $35^{th}$ conductor, a $37^{th}$ conductor, and a $39^{th}$ conductor 1021 are a-layer conductors 1021, and a $34^{th}$ conductor, a $36^{th}$ conductor, a $38^{th}$ conductor, and a $40^{th}$ conductor 1021 are b-layer conductors 1021. A $41^{st}$ conductor, a $43^{rd}$ conductor, a $45^{th}$ conductor, and a $47^{th}$ conductor 1021 are c-layer conductors 1021. A $42^{nd}$ conductor, a $44^{th}$ conductor, a $46^{th}$ conductor, and a $48^{th}$ conductor 1021 are d-layer conductors 1021. A $49^{th}$ conductor, a $51^{st}$ conductor, a $53^{rd}$ conductor, and a $55^{th}$ conductor 1021 are e-layer conductors 1021. A $50^{th}$ conductor, a $52^{nd}$ conductor, a $54^{th}$ conductor, and a $56^{th}$ conductor 1021 are f-layer conductors 1021. A $57^{th}$ conductor, a $59^{th}$ conductor, a $61^{st}$ conductor, and a $63^{rd}$ conductor 1021 are g-layer conductors 1021. A $58^{th}$ conductor, a $60^{th}$ conductor, a $62^{nd}$ conductor, and a $64^{th}$ conductor 1021 are h-layer conductors 1021.

In some embodiments of the present disclosure, the conductor 1021 connected to the first positive lead U1+ of the first branch U1 and the conductor 1021 connected to the second positive lead U2+ of the second branch U2 are provided in the same winding slot 1011. The embodiment of the present disclosure leads out the incoming ends of the two branches U2 from the same winding slot 1011, thereby further reducing the distance between the incoming ends of the two branches, facilitating the connection of the incoming ends of the two branches, and facilitating the arrangement of bus bars and the implementation of winding processing technology.

In an embodiment of the present disclosure, the $32^{nd}$ conductor 1021 and the $33^{rd}$ conductor 1021 of the second branch U2 are both a-layer conductors 1021. The conductors 1021 of the same layer that are connected can balance the slot potentials of the branches, and reduce current-circulation loss between the branches.

In some embodiments of the present disclosure, the $1^{st}$ conductor 1021 connected to the second positive lead U2+ is located in the $14^{th}$ winding slot, and the $64^{th}$ conductor 1021 connected to the second negative lead U2− is located in the $7^{th}$ winding slot.

In some embodiments of the present disclosure, the $1^{st}$ conductor 1021 connected to the second positive lead U2+ and the $64^{th}$ conductor 1021 connected to the second negative lead U2− are both h-layer conductors 1021. This embodiment facilitates the arrangement of the bus bars, thereby facilitating the connection of the second positive lead U2+ and the second negative lead U2− to an external circuit.

In some embodiments of the present disclosure, the stator includes eight poles, and correspondingly, the phase winding includes eight pole phase groups. The sixty-four conductors of the second branch U2 are arranged in the eight pole phase groups to reduce the potential imbalance of the branch due to rotor eccentricity.

In some embodiments of the present disclosure, a plurality of branches of a phase winding may be connected in series or in parallel. In an embodiment, the first branch U1 and the second branch U2 may be connected in series or in parallel.

As shown in FIGS. 10A-10I, the $1^{st}$ conductor 1021 of the first branch U1 is connected to the first positive lead U1+ of the first branch U1, and the $1^{st}$ conductor 1021 of the second branch U2 is connected to the second positive lead U2+ of the second branch U2. Alternatively, the $1^{st}$ conductor 1021 of the first branch U1 and the $1^{st}$ conductor 1021 of the second branch U2 are disposed in the same winding slot, i.e., the 14th winding slot. The incoming ends of the two branches extend through the same winding slot, which can further reduce the spacing between the incoming ends of the two branches, facilitating the connection of the incoming ends of the two branches, and facilitating the arrangement of the bus bars and implementation of the winding processing technology.

In some embodiments, the $1^{st}$ conductor 1021 of the first branch U1 and the $64^{th}$ conductor 1021 of the first branch U1 are both a-layer conductors 1021, and the $1^{st}$ conductor 1021 of the second branch U2 and the $64^{th}$ conductor 1021 of the second branch U2 are both h-layer conductors 1021. This embodiment facilitates the arrangement of the bus bars, facilitating the connections of the two incoming ends (U1+, U2+) and the two outgoing ends (U1−, U2−) to an external circuit.

In some embodiments of the present disclosure, the stator winding 102 includes three phase windings, and the three phase windings are connected in a star-type connection.

In an embodiment, a steady-state voltage drop of adjacent out-of-phase conductors 1021 in the same winding slot 1011 is calculated by a formula $[(2 \times 4k - x - y)/4k] \times U_{dc}/2$. $U_{dc}$ is a bus voltage, x and y are reference numbers of two adjacent out-of-phase conductors 1021, respectively, and 4k is the total number of conductors 1021 of the first branch. The maximum voltage drop of the out-of-phase conductors 1021 in the same winding slot according to the embodiments of the present disclosure is 0.29 $U_{dc}$.

A steady-state voltage drop of adjacent in-phase conductors 1021 in the same winding slot 1011 can be calculated by a formula $[|x - y|/4k] \times U_{dc}/1.732$. $U_{dc}$ is a bus voltage, and x and y are reference numbers of two adjacent in-phase conductors 1021, respectively.

The maximum voltage drop of the in-phase conductors 1021 in the same winding slot according to the embodiments of the present disclosure is 0.27 $U_{dc}$.

Compared with the stator including the full-pitch winding and the short-pitch winding in the related art, the in-phase and out-phase voltage drops in the slot according to the embodiments of the present disclosure are greatly reduced, which facilitates the insulation design in the winding slot and improves the insulation reliability.

It can be seen from the above that the U-phase winding shown in FIGS. 10A-10I can balance the slot potential of each of the branches, reduce the current-circulation loss between the branches, reduce the imbalance of branch electromotive forces caused by rotor eccentricity, and reduce the voltage stress of the conductors 1021 in the slot, while facilitating the arrangement of bus bars and the implementation of winding processing technology.

Figures 10I, 11A:
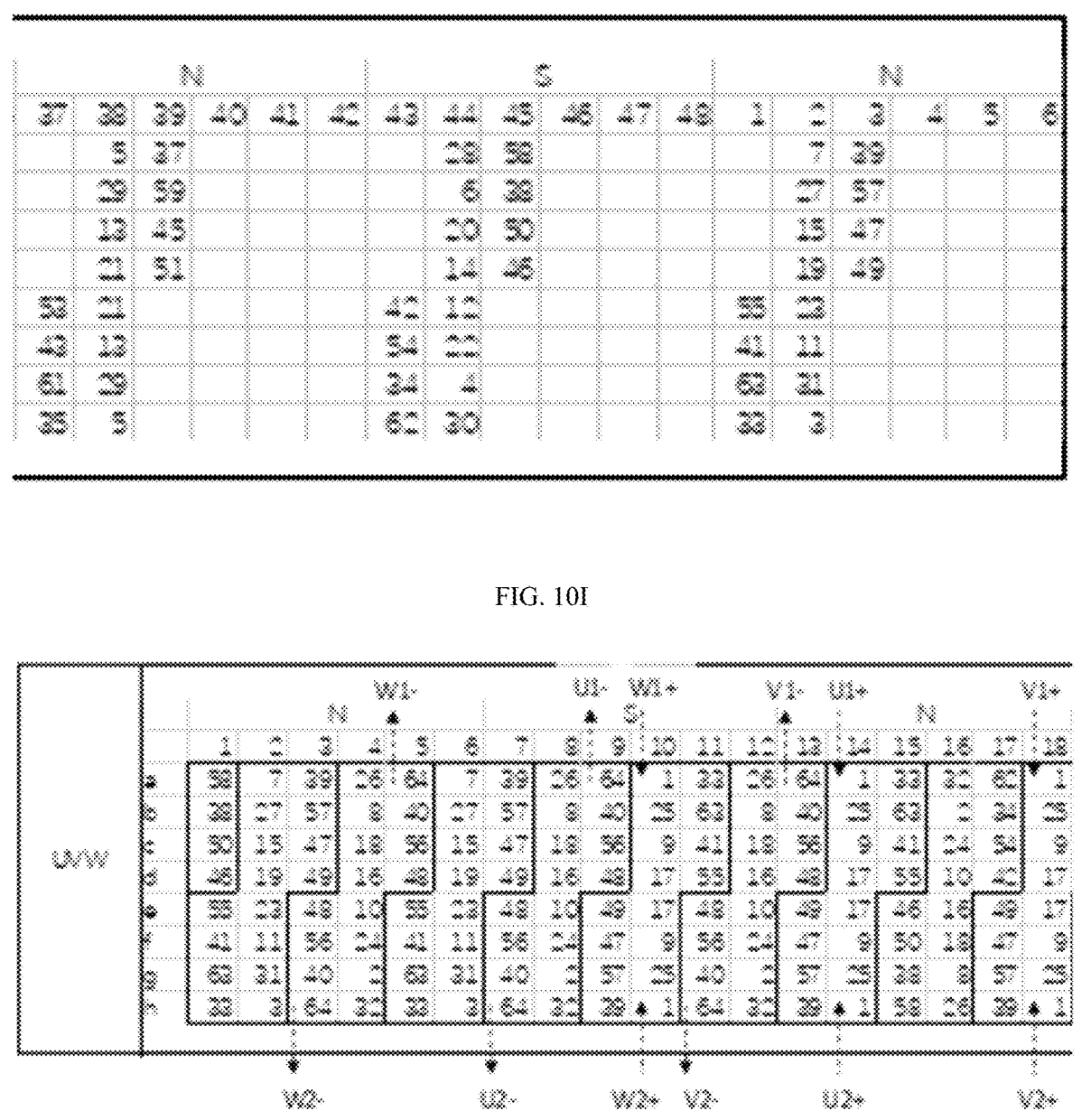
Figures 11B, 11C:
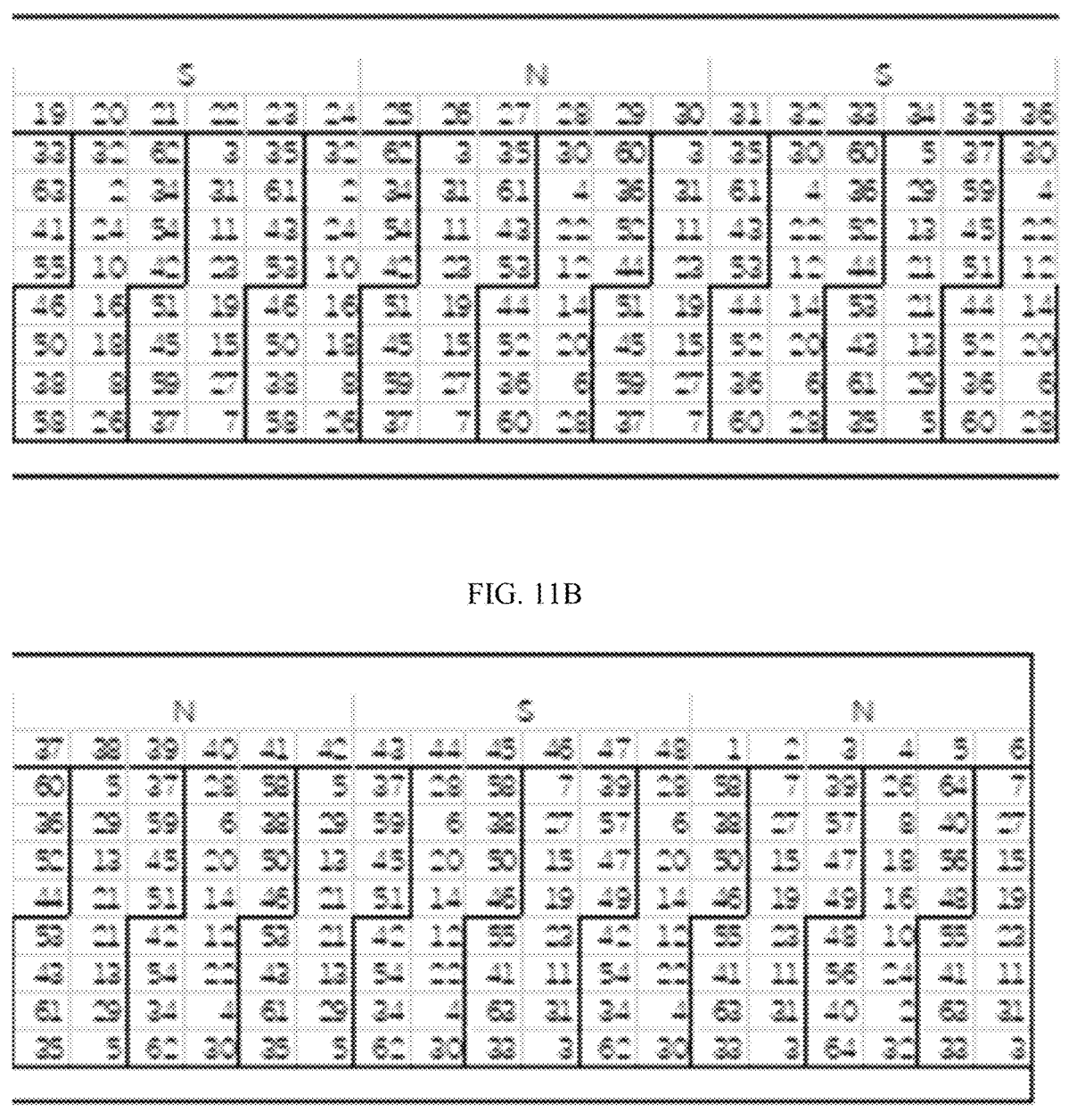

FIGS. 11A-11C are schematic diagrams of three phase windings of a stator according to some embodiments of the present disclosure. FIGS. 11A-11C show a U-phase winding, a V-phase winding, and a W-phase winding of a stator winding.

In an embodiment, as shown in FIGS. 11A-11C, the U-phase winding includes a first branch U1 and a second branch U2. U1+ represents a first positive lead of the first branch U1, and U1− represents a first negative lead of the first branch U1. U2+ represents a second positive lead of the second branch U2, and U2− represents a second negative lead of the second branch U2.

The V-phase winding includes a first branch V1 and a second branch V2. V1+ represents a first positive lead of the first branch V1, and V1− represents a first negative lead of the first branch V1−. V2+ represents a second positive lead of the second branch V2, and V2− represents a second negative lead of the second branch V2.

The W phase winding includes a first branch W1 and a second branch W2. W1+ represents a first positive electrode lead of the first branch W1, and W1− represents a first negative electrode lead of the first branch W1, W2+ represents a second positive lead of the second branch W2, and W2− represents a second negative lead of the second branch W2.

In some embodiments, twelve conductors connected to the leads U1+, U1−, U2+, U2−, V1+, V1−, V2+, V2−, W1+, W1−, W2+ and W2− are disposed in nine winding slots.

In some embodiments, six conductors connected to the leads U1+, U1−, W1+, W1−, V1+, and V1− are all a-layer conductors. Each of the aforementioned leads is located close to a radially outer end of the stator iron core to facilitate welding.

Figure 12:
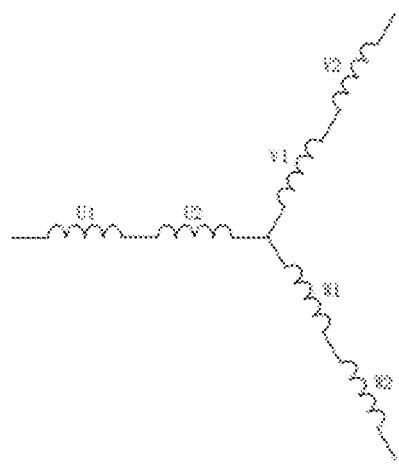
FIG. 12 is a schematic diagram of a connection of phase windings of a stator winding of a stator according to some embodiments of the present disclosure.

As shown in FIG. 12, in some embodiments, the stator winding 102 includes three phase windings, i.e., a U phase winding, a V phase winding, and a W phase winding. In an embodiment, the three phase windings are connected in a triangle form.

The U-phase winding includes a first branch U1 and a second branch U2 connected in series. The V-phase winding includes a first branch V1 and a second branch V2 connected in series. The W-phase winding includes a first branch W1 and a second branch W2 connected in series.

Figure 13:
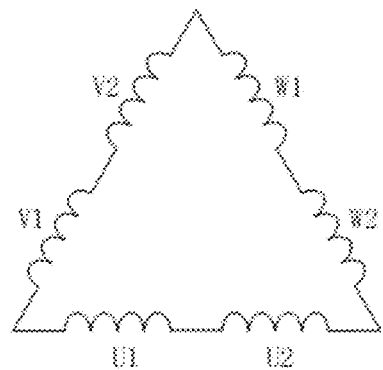
FIG. 13 is a schematic diagram of a connection of phase windings of a stator winding of a stator according to other embodiments of the present disclosure.

As shown in FIG. 13, in some embodiments, the stator winding includes three phase windings, i.e., a U-phase winding, a V-phase winding, and a W-phase winding. In an embodiment, the three phase windings are connected in a star form.

The U-phase winding includes a first branch U1 and a second branch U2 connected in series. The V-phase winding includes a first branch V1 and a second branch V2 connected in series. The W-phase winding includes a first branch W1 and a second branch W2 connected in series.

Figure 14:
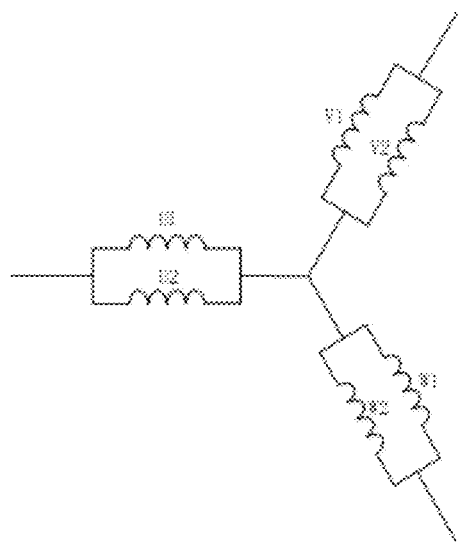
FIG. 14 is a schematic diagram of a connection of phase windings of a stator winding of a stator according to still other embodiments of the present disclosure.

FIG. 14 is a schematic diagram of a connection of phase windings of a stator winding of a stator according to still other embodiments of the present disclosure.

As shown in FIG. 14, in some embodiments, the stator winding includes three phase windings, i.e., a U-phase winding, a V-phase winding, and a W-phase winding. In an embodiment, the three phase windings are connected in a triangle form.

The U-phase winding includes a first branch U1 and a second branch U2 connected in parallel. The V-phase winding includes a first branch V1 and a second branch V2 connected in parallel. The W-phase winding includes a first branch W1 and a second branch W2 connected in parallel.

Figure 15:
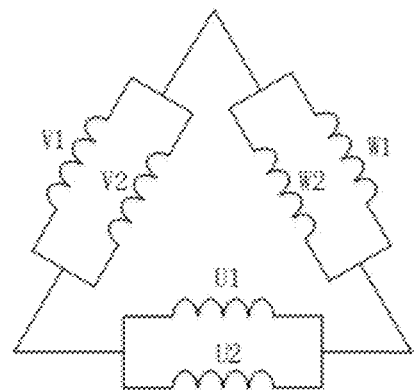
FIG. 15 is a schematic diagram of a connection of phase windings of a stator winding of a stator according to yet still other embodiments of the present disclosure.

FIG. 15 is a schematic diagram of a connection of phase windings of a stator winding of a stator according to yet still other embodiments of the present disclosure.

As shown in FIG. 15, in some embodiments, the stator winding includes three phase windings, i.e., a U-phase winding, a V-phase winding, and a W-phase winding. In an embodiment, the three phase windings are connected in a star form.

The U-phase winding includes a first branch U1 and a second branch U2 connected in parallel. The V-phase winding includes a first branch V1 and a second branch V2 connected in parallel. The W-phase winding includes a first branch W1 and a second branch W2 connected in parallel.

With reference to the different stator windings shown in FIGS. 12-15, the number of series turns of the stator winding can be adjusted by changing the connecting manner of the phase windings and the connecting manner of the branches of the phase windings, to accommodate different voltage and power level applications.

Embodiments of the present disclosure also provide a motor including the stator as provided in any of the foregoing embodiments. In an embodiment, the motor further includes a rotor provided in a space, which is defined by an inner wall of the stator iron core.

The motor of the embodiments of the present disclosure may be either a generator or an electric motor.

Embodiments of the present disclosure also provide an electric device that includes the motor as provided in any of the previous embodiments.

In some embodiments, the electric device includes a powertrain including a speed reducer and the motor as described above. The motor is connected to the speed reducer in a transmission manner. In an embodiment, a driving shaft of the motor and an input shaft of the speed reducer may be connected in a transmission manner through a transmission member such as a coupler, to output a driving force from the motor to the speed reducer.

Embodiments of the present disclosure further provide a vehicle including the above powertrain, which is disposed within the vehicle and provides an operating power for the vehicle. In an exemplary embodiment of the present disclosure, the vehicle may be a new energy vehicle driven with electric energy, for example. The new energy vehicle may be a hybrid electric vehicle, a pure electric vehicle, or a fuel cell electric vehicle, or may be a vehicle that uses a high-efficiency accumulator as an electric energy source, such as a supercapacitor, a flywheel battery, or a flywheel accumulator.

It is noted that the embodiments of the disclosure and features of the embodiments may be combined with one another without conflict.

Finally, it should be noted that the above embodiments are only used to illustrate the technical solution of the present disclosure and are not intended to limit the present disclosure thereto. Although the present disclosure has been described in detail with reference to the aforementioned embodiments, those skilled in the art should understand that they can still modify the technical solutions described in the aforementioned embodiments, or equivalently replace some of the technical features. These modifications or substitutions do not separate the essence of the corresponding technical solutions from the scope of the technical solutions of the various embodiments of the present disclosure.

What is claimed is:

1. A stator of a motor, the stator comprising:
a stator iron core having a plurality of winding slots formed in an inner wall of the stator iron core; and
a stator winding provided at the stator iron core, the stator winding comprising a plurality of conductors inserted in the plurality of winding slots and a plurality of phase windings,
wherein n conductor layers are arranged in each of the plurality of winding slots, n being a positive even number, and the n conductor layers being denoted as an $L_1$ conductor layer, an $L_2$ conductor layer, and to an $L_n$ conductor layer in a direction in which a bottom of the winding slot is directed towards an opening of the winding slot;
wherein each of the plurality of phase windings comprises a plurality of pole phase groups, each of the plurality of pole phase groups of the phase winding comprising a first region, a second region, and a third region, and the second region and the third region being respectively located at two sides of the first region;
wherein the $L_1$ conductor layer to the $L_n$ conductor layer are located in the first region, an $L_{n/2+1}$ conductor layer to the $L_n$ conductor layer being located in the second region, and the $L_1$ conductor layer to an $L_{n/2}$ conductor layer being located in the third region;
wherein each of the plurality of phase windings comprises a first branch and a second branch, the first branch comprising 4k conductors sequentially connected in series, where k is a positive integer, the 4k conductors of the first branch being denoted as an $A_1$ conductor, to an $A_{2k}$ conductor, and to an $A_{4k}$ conductor, the second branch comprising 4k conductors sequentially connected in series, and the 4k conductors of the second branch being denoted as a $B_1$ conductor, to a $B_{2k}$ conductor, and to a $B_{4k}$ conductor;

wherein the $A_1$ conductor to the $A_{2k}$ conductor and the $B_1$ conductor to the $B_{2k}$ conductor are arranged in the first region;

wherein some of an $A_{2k+1}$ conductor to the $A_{4k}$ conductor are arranged in the second region, and the remaining of the $A_{2k+1}$ conductor to the $A_{4k}$ conductor are arranged in the third region; and wherein some of a $B_{2k+1}$ conductor to the $B_{4k}$ conductor are arranged in the second region, and the remaining of the $B_{2k+1}$ conductor to the $B_{4k}$ conductor are arranged in the third region.

2. The stator according to claim 1, wherein:
the $A_{2k+1}$ conductor to an $A_{3k}$ conductor are arranged in the second region;
an $A_{3k+1}$ conductor to the $A_{4k}$ conductor are arranged in the third region;
the $B_{2k+1}$ conductor to a $B_{3k}$ conductor are arranged in the third region; and
a $B_{3k+1}$ conductor to the $B_{4k}$ conductor are distributed in the second region.

3. The stator according to claim 1, wherein the $A_1$ conductor and the $B_1$ conductor are located in one winding slot of the plurality of winding slots.

4. The stator according to claim 3, wherein:
the $A_1$ conductor is a conductor of the $L_1$ conductor layer in the one winding slot; and
the $B_1$ conductor is a conductor of the $L_n$ conductor layer in the one winding slot.

5. The stator according to claim 4, wherein:
the first branch comprises a first positive lead connected to the $A_1$ conductor and a first negative lead connected to the $A_{4k}$ conductor; and
the second branch comprises a second positive lead connected to the $B_1$ conductor and a second negative lead connected to the $B_{4k}$ conductor.

6. The stator according to claim 1, wherein the first branch comprises:
at least one first single-conductor plug connector, each of the at least one first single-conductor plug connector comprising one conductor; and
a plurality of first dual-conductor plug connectors, each of the plurality of first dual-conductor plug connectors comprising two conductors.

7. The stator according to claim 6, wherein the at least one first single-conductor plug connector comprises two first single-conductor plug connectors, one of the two first single-conductor plug connectors comprising the $A_1$ conductor, and another one of the two first single-conductor plug connectors comprising the $A_{4k}$ conductor.

8. The stator according to claim 6, wherein the plurality of first dual-conductor plug connectors comprises a first plug connector, a second plug connector, and a third plug connector, wherein:
a span between two conductors of the first plug connector is equal to a pole pitch;
a span between two conductors of the second plug connector is smaller than the pole pitch; and
a span between two conductors of the third plug connector is greater than the pole pitch.

9. The stator according to claim 8, wherein:
the $A_{2k}$ conductor and the $A_{2k+1}$ conductor are the two conductors of the third plug connector, respectively; and
the $A_{3k}$ conductor and the $A_{3k+1}$ conductor are the two conductors of the second plug connector, respectively.

10. The stator according to claim 1, wherein the second branch comprises:

at least one second single-conductor plug connector, each of the at least one second single-conductor plug connector comprising one conductor; and
a plurality of second dual-conductor plug connectors, each of the plurality of second dual-conductor plug connectors comprising two conductors, wherein:
the at least one second single-conductor plug connector comprises two second single-conductor plug connectors, one of the two second single-conductor plug connectors comprising the $B_1$ conductor, and another one of the two second single-conductor plug connectors comprising the $B_{4k}$ conductor; and
the plurality of second dual-conductor plug connectors comprises a fourth plug connector, a fifth plug connector, and a sixth plug connector, wherein:
a span between two conductors of the fourth plug connector is equal to a pole pitch;
a span between two conductors of the fifth plug connector is smaller than the pole pitch; and
a span between two conductors of the sixth plug connector is smaller than the span between the two conductors of the fifth plug connector.

11. The stator according to claim 10, wherein:
the $B_{2k}$ conductor and the $B_{2k+1}$ conductor are the two conductors of the fifth plug connector, respectively; and
the $B_{3k}$ conductor and the $B_{3k+1}$ conductor are the two conductors of the sixth plug connector, respectively.

12. The stator according to claim 1, wherein the stator winding comprises three phase windings in a star-type connection or a triangle-type connection.

13. The stator according to claim 1, wherein the number of the plurality of winding slots is a multiple of twelve.

14. The stator according to claim 1, wherein:
the stator iron core has forty-eight winding slots;
eight conductor layers are arranged in each of the plurality of winding slots; and
the stator has eight poles.

15. A motor, comprising a stator and a rotor, wherein the stator comprises:
a stator iron core having a plurality of winding slots formed in an inner wall of the stator iron core; and
a stator winding provided at the stator iron core, the stator winding comprising a plurality of conductors inserted in the plurality of winding slots and a plurality of phase windings,
wherein n conductor layers are arranged in each of the plurality of winding slots, n being a positive even number, and the n conductor layers being denoted as an $L_1$ conductor layer, an $L_2$ conductor layer, and to an $L_n$ conductor layer in a direction in which a bottom of the winding slot is directed towards an opening of the winding slot;
wherein each of the plurality of phase windings comprises a plurality of pole phase groups, each of the plurality of pole phase groups of the phase winding comprising a first region, a second region, and a third region, and the second region and the third region being respectively located at two sides of the first region;
wherein the $L_1$ conductor layer to the $L_n$ conductor layer are located in the first region, an $L_{n/2+1}$ conductor layer to the $L_n$ conductor layer being located in the second region, and the $L_1$ conductor layer to an $L_{n/2}$ conductor layer being located in the third region;
wherein each of the plurality of phase windings comprises a first branch and a second branch, the first branch comprising 4k conductors sequentially connected in series, where k is a positive integer, the 4k conductors of the first branch being denoted as an $A_1$ conductor, to an $A_{2k}$ conductor, and to an $A_{4k}$ conductor, the second branch comprising 4k conductors sequentially connected in series, and the 4k conductors of the second branch being denoted as a $B_1$ conductor, to a $B_{2k}$ conductor, and to a $B_{4k}$ conductor;

wherein the $A_1$ conductor to the $A_{2k}$ conductor and the $B_1$ conductor to the $B_{2k}$ conductor are arranged in the first region;

wherein some of an $A_{2k+1}$ conductor to the $A_{4k}$ conductor are arranged in the second region, and the remaining of the $A_{2k+1}$ conductor to the $A_{4k}$ conductor are arranged in the third region; and wherein some of a $B_{2k+1}$ conductor to the $B_{4k}$ conductor are arranged in the second region, and the remaining of the $B_{2k+1}$ conductor to the $B_{4k}$ conductor are arranged in the third region.

16. An electric device, comprising the motor according to claim 15.

* * * * *